Patented Nov. 24, 1931

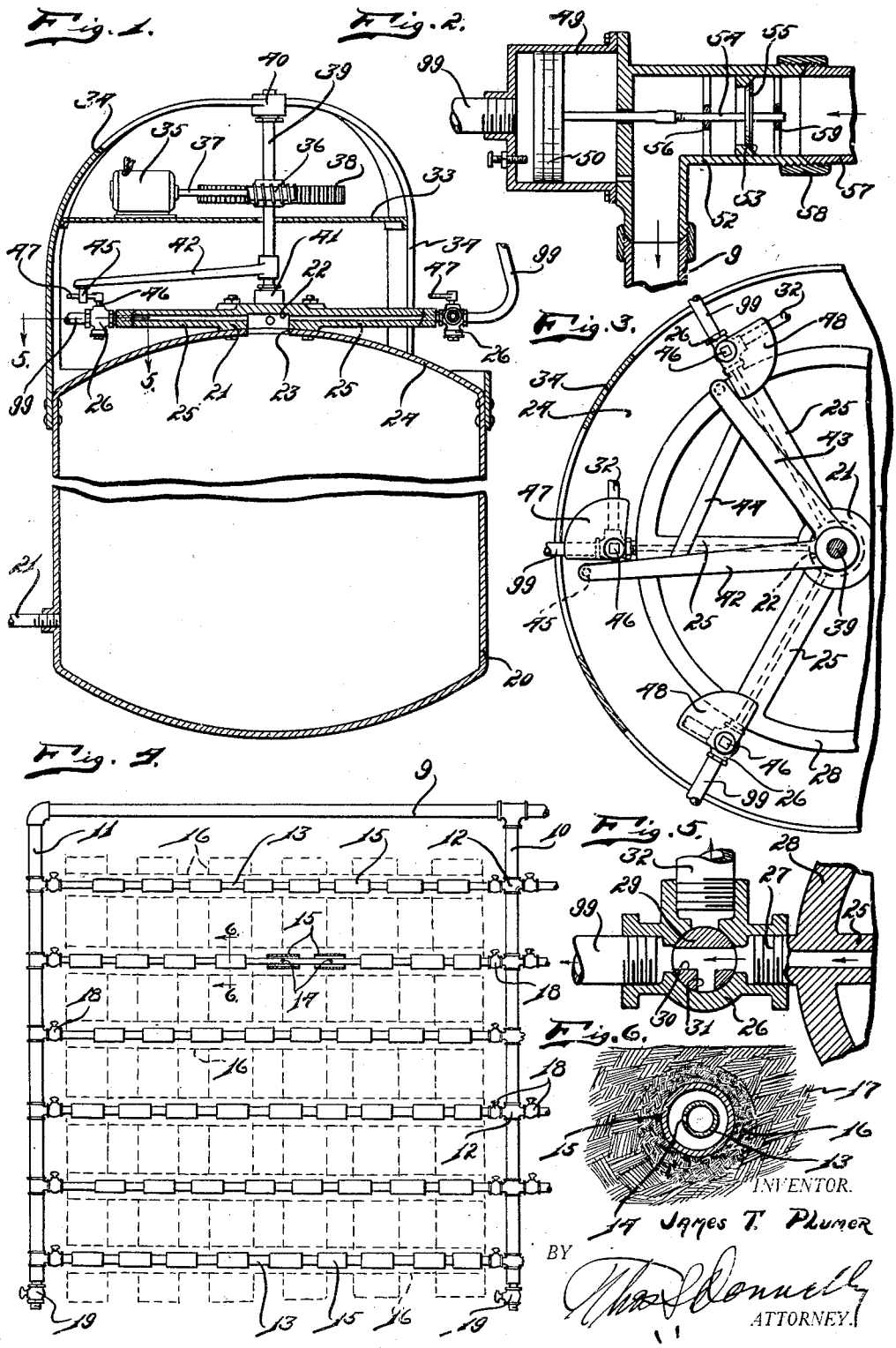

1,832,915

UNITED STATES PATENT OFFICE

JAMES T. PLUMER, OF NILES, MICHIGAN

SPRINKLING APPARATUS

Application filed November 18, 1929. Serial No. 407,894.

My invention relates to a new and useful improvement in a sprinkling apparatus and has for its object the provision of a sprinkling apparatus which may be operated for under surface irrigation and which while being operated will not injure the roots of growing plants and the like.

It is another object of the present invention to provide a control mechanism whereby the control of different units of the sprinkling operation may be automatically operated.

Another object of the invention is the provision of a plurality of sprinkling conduits positioned under ground and provided with guards or shields for protecting the soil around the conduits so that a washing of the soil will be prevented.

Another object of the invention is the provision of an automatic control mechanism which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawings which form a part of this specification, and in which, Fig. 1 is a sectional view of a part of the invention.

Fig. 2 is a central sectional view of a valve and operating mechanism used in the invention.

Fig. 3 is a fragmentary top plan view of a valve actuating mechanism.

Fig. 4 is a plan view of the sprinkling conduits.

Fig. 5 is a sectional view taken on line 5—5 of Fig. 1.

Fig. 6 is a sectional view taken on line 6—6 of Fig. 4.

In the invention I provide a manifold or water conduit 9 connected with which are laterally extending manifolds or conduits 10 and 11. Connecting through T's 12 are tubes 13 which serve to establish communication between the adjacent parallel extending lateral conduits or manifolds 10 and 11. At spaced intervals in the tubes 13 are outlet openings 14. A shield or sleeve 15 is loosely positioned over the tube 13 at each of the outlet openings 14 as shown in Fig. 6 the sleeve 15 is of considerably larger diameter than the tube 13. The tubes 13 as well as the pipes 9, 10, and 11 are embedded in the ground 17 which it is desired to irrigate. Extending around each of the pipes 13 is a layer of fine sand 16 extending transversely of the pipes 13 at spaced intervals are layers of sand 16 to afford a passage for the flow of the water so that the water may permeate the soil 17 through the area defined by the sprinkling apparatus. A control valve 18 is positioned at each end of the tube 13 to control the flow of water therethrough. A drain cock 19 is mounted at the end of each of the conduits or manifolds.

In the use of this sprinkling apparatus underground when the water is delivered under pressure to the pipes 9 it will flow through the manifold or conduits 10 and 11 and issue from the outlet openings in the tubes 13. The shield 15 will prevent washing away of the dirt around the outlet opening so that a slow flow or filtering of the water gradually into the earth may be affected and adjacent outlet openings in each pipe are so located as to thoroughly saturate the earth between these outlet openings. Similarly the tubes 13 are located in spaced relation in communication with the pipes 10 and 11 such that the space of earth between adjacent tubes 13 will be thoroughly saturated.

In a sprinkling system of this kind various independent units may be installed in various adjacent or independent areas and I have provided a means for controlling the flow of water into these various units with a minimum amount of effort and labour expense.

To this end I provide a tank 20 communicating with which is an inlet pipe 21 whereby water under pressure may be conducted to the tank 20. Fixedly mounted on the upper side of the tank 20 is a hub 21 which has a recess 22 formed therein registering with the opening 23 formed in the top 24 of the tank. A plurality of hollow arms or spokes 25 radiate outwardly from the hub 21 each being in communication with the recess 22. A three way valve is interposed between each of the arms or spokes 25 and the delivery pipes 99. These valves comprise a housing 26 which is threaded on the nipple 27 projecting outwardly from the arms or spokes, these arms or spokes being connected by a rim 28. Rotatably mounted in the housing 26 is a cock 29 having the passage 30 formed therein which extends diametrically through the cock 29 and communicates with the lateral passage 31. The pipe 99 is threaded into one end of the housing 26 and a drain pipe 32 is threaded into the side of the housing 26.

Positioned on a suitable support 33 supported by the arms or uprights 34 is an electric motor 35 having a worm 36 fixedly mounted on its shaft 37 and meshing with a worm wheel 38 fixedly mounted on the shaft 39 which is journaled in the bearings 40 and 41. Fixedly mounted on the shaft 39 is a pair of arms 42 and 43 connected by the cross-bar 44. Projecting downwardly from the end of each of the arms 42 and 43 is a pin 45. Fixedly mounted on the stem 46 of each of the valves are triangularly shaped plates 47 and 48. The construction is such that when the motor is set into rotation the arm 42 is brought into engagement with the plate 47 so as to rock it into the corresponding position of the plate 48 which will rotate the stem 46 through 90 degrees. The passages 30 and 31 will establish communication between the delivery pipe 99 and the drain pipe 32 at the same time the arm 43 which is shorter than the stem 42 will rock the valve stem 46 to a position which will establish communication between the tank 20 and the pipe 99. This will permit the flow of water through the pipe 99 into the cylinder 49. Positioned in the cylinder 49 is a piston 50 which extends into the fitting 52 in which is formed the valve seat 53. Fixedly mounted on the extension 54 of the rod 51 is a valve 55 which is adapted to engage the valve seat 53 and prevent the flowing of water through the fitting in the direction indicated by the arrows. Guide spider 56 is mounted in the fitting 52 and through this guide spider is projected the rod 54. Delivery pipe 57 which is connected to the supply of water under pressure such as a pump or the city pressure lines is connected by the collar 58 to this fitting 52 and a guide spider 59 is positioned in the pipe 57 to serve as a guide for the rod extension 54. The pipe 99 is connected in communication with the fitting 52. In use, when the pipe 99 is connected in communication with the tank 20, the water under pressure in the tank 20 will flow into the cylinder 49 and move the piston 50 so as to force the valve 55 from its seat and permit the flow of water into the pipe 9. One of these fitting 52 will be provided for each unit of the sprinkling system and by having a number of these units connected to the various arms or spokes 25 it is evident that a number of areas may be sprinkled alternately. The gearing from the motor shaft 37 is sufficiently reduced to permit the sprinkling of each area a sufficient length of time for proper irrigation.

With a sprinkling apparatus such as described an underground irrigation becomes possible and the proper irrigation of a large area may be affected with a minimum amount of effort. It will be noted that with the control mechanism described only one of the units will be in operation at a time but this might be varied by locating the arms 42 and 43 with the different distances between them or at different relative inclinations.

The tubes 13 are preferably made from copper which will reduce the bursting of the pipes in the event of freezing to a minimum. These tubes 13 are also formed flexible or easily bendable and are preferably laid on a level even when used for irrigating a rolling peice of ground the pipes being laid around the knoll or elevation but still maintained substantially in a horizontal position. This will assure proper irrigation through the length of the tube and prevent a washing away of the dirt from around the tube.

It will be noted that the outlet openings 14 are so positioned as to be at the side of the tube 13 so that should the tubes not drain and freezing result the tubes will never be more than half filled so that the freezing would not burst the tubes 15.

By sprinkling with an underground installation because of the delivery of the water below the surface the ground is maintained in a porous condition. Because all of the water is absorbed and surface evaporation is prevented an economical irrigation becomes possible and the use of the system will prevent scalding of vegetation and the inconveniences resulting from splashing and sprinkling onto shrubs, walks, etc., which is generally the case where surface sprinklers are used.

With the surface sprinklers it is necessary, in order to spread the water the necessary distance, that ample pressure be provided, whereas with the underground system efficient irrigation can be accomplished with a very low pressure it being but necessary that the water be under sufficient pressure to flow through the pipes and tubes.

While I have illustrated and described the preferred form of construction I do not wish to limit myself to the precise details of structure shown but desire to avail myself of such variations and modifications as come within the scope of the appended claims.

Having thus described my invention what

I claim as new and desire to secure by Letters Patent is:

1. In the sprinkling apparatus of the class described: a plurality of delivery pipes; means for each of said delivery pipes for controlling delivery of water through each of said delivery pipes; a control mechanism for each of said means positioned at a distance therefrom for controlling the opening and closing of said means; and rotatable means for operating said control mechanism selectively.

2. In a sprinkling apparatus of the class described, a plurality of delivery pipes; a plurality of valves, each for controlling delivery of water through one of said delivery pipes; a plurality of rotatable arms of varying lengths; means for rotating said arms; engagement means on each of said arms; and means associated with each of said valves engageable with the engagement means on each of said arms dependent upon the position of the valve with which associated.

3. In a sprinkling apparatus of the class described, a plurality of delivery pipes; a plurality of valves each adapted for controlling delivery of water through one of said delivery pipes; a plurality of rotatable arms of varying lengths; movable means associated with each of said valves movable into one position upon the opening of said valve, and movable into another position upon the closing of said valve, and engageable when in one position with one of said arms, the continued rotation of said arm while in engagement therewith effecting a movement to the other position of said member; and means for rotating said arms.

4. In a sprinkling apparatus of the class described, a plurality of delivery pipes in spaced relation; a plurality of valves each interposed in a delivery pipe for controlling delivery of water therethrough; an engagement member associated with each of said valves, movable into one position for opening said valve, and into another position for closing said valve; a plurality of arms of varying lengths in spaced relation to each other co-ordinated to the spacing of adjacent engagement members such that upon rotation of said arms a pair of said arms may engage a pair of said engagement members simultaneously, the rotation of said arms subsequent to engagement effecting the movement of the engagement members from one position to another; and means for rotating said arms.

5. In a sprinkling apparatus of the class described, a plurality of delivery pipes in spaced relation; a plurality of valves each interposed in a delivery pipe for controlling delivery of water therethrough; an engagement member associated with each of said valves, movable into one position for opening said valve, and into another position for closing said valve; a plurality of arms of varying lengths in spaced relation to each other co-ordinated to the spacing of adjacent engagement members, such that upon rotation of said arms, a pair of said arms may engage a pair of said engagement members simultaneously, the rotation of said arms subsequent to engagement effecting the movement of the engagement members from one position to another, one of said members so engaged being moved to open position, and the other to closed position.

In testimony whereof I have signed the forgoing specification.

JAMES T. PLUMER.